United States Patent
Ponnada

(10) Patent No.: US 12,420,457 B2
(45) Date of Patent: Sep. 23, 2025

(54) METHOD FOR MANUFACTURING OF A PRE-FORM PART FOR A WIND TURBINE BLADE AND MOLD FOR THE MANUFACTURING OF A PRE-FORM PART

(71) Applicant: Siemens Gamesa Renewable Energy A/S, Brande (DK)

(72) Inventor: Sri Markandeya Rajesh Ponnada, Aalborg (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 17/699,709

(22) Filed: Mar. 21, 2022

(65) Prior Publication Data
US 2022/0314498 A1 Oct. 6, 2022

(30) Foreign Application Priority Data
Apr. 1, 2021 (EP) .................................... 21166625

(51) Int. Cl.
*B29C 35/02* (2006.01)
*B29B 11/12* (2006.01)
(Continued)

(52) U.S. Cl.
CPC .......... *B29C 35/0272* (2013.01); *B29B 11/12* (2013.01); *B29B 11/16* (2013.01); *B29K 2307/04* (2013.01); *B29L 2031/085* (2013.01)

(58) Field of Classification Search
CPC ... B29C 35/0272; B29C 70/885; B29C 70/54; B29C 70/86; B29C 70/88; B29C 70/882; B29C 61/0625; B29C 2035/0211
See application file for complete search history.

(56) References Cited

U.S. PATENT DOCUMENTS 4,385,957 A 5/1983 Wackerle
4,560,428 A * 12/1985 Sherrick ............. B29C 65/4835
156/286
(Continued)

FOREIGN PATENT DOCUMENTS

CN 104245803 A 12/2014
CN 105473301 A 4/2016
(Continued)

OTHER PUBLICATIONS

"Types of Heating Elements" Publicly available online Dec. 10, 2020, <https://www.heating-element-alloy.com/article/heating-elements-properties-and-types.html> (Year: 2020).*
(Continued)

*Primary Examiner* — Michael A Tolin
*Assistant Examiner* — Hana C Page
(74) *Attorney, Agent, or Firm* — Schmeiser, Olsen & Watts, LLP

(57) ABSTRACT

A method for manufacturing of a pre-form part for a wind turbine blade including one or more components and an adhesive, wherein the component or at least one of the components is a mat-like component including fibres, includes the steps: arranging the adhesive at one or more positions on the component or arranging the components in a stack, wherein the adhesive is arranged at one or more positions between the components, and heating the adhesive by providing an electric current to at least one actively heated layer, wherein the mat-like component is used as actively heated layer and/or wherein at least one additional mat-like heating means provided and arranged on top of or below the component or the stack of components is used as actively heated layer.

16 Claims, 8 Drawing Sheets

(51) Int. Cl.
  *B29B 11/16*   (2006.01)
  *B29K 307/04*   (2006.01)
  *B29L 31/08*   (2006.01)

(56) References Cited

U.S. PATENT DOCUMENTS

| | | | |
|---|---|---|---|
| 5,591,291 | A | 1/1997 | Blackmore |
| 5,656,231 | A * | 8/1997 | Blackmore ....... B29C 66/91221 |
| | | | 264/408 |
| 5,866,060 | A | 2/1999 | Buckley |
| 8,764,428 | B2 * | 7/2014 | Segura Moreno ...... B29B 11/16 |
| | | | 425/389 |
| 11,623,369 | B2 * | 4/2023 | Madsen ................ B29C 70/541 |
| | | | 156/242 |
| 2003/0168164 | A1 * | 9/2003 | Blackmore ......... B29C 66/8322 |
| | | | 156/244.11 |
| 2004/0170554 | A1 * | 9/2004 | Wadahara ............... B32B 5/024 |
| | | | 423/447.2 |
| 2013/0098527 | A1 | 4/2013 | Harms |
| 2015/0048555 | A1 | 2/2015 | Nagasaki et al. |
| 2015/0258743 | A1 * | 9/2015 | Lanard .................. B29C 70/541 |
| | | | 425/500 |
| 2016/0158970 | A1 | 6/2016 | Xie |
| 2019/0001592 | A1 | 1/2019 | Nielsen |
| 2019/0233598 | A1 * | 8/2019 | Moran .................. B29C 70/083 |
| 2020/0263657 | A1 | 8/2020 | Badger |

FOREIGN PATENT DOCUMENTS

| | | |
|---|---|---|
| CN | 108698341 A | 10/2018 |
| CN | 111344486 A | 6/2020 |
| WO | 2012042261 A1 | 4/2012 |

OTHER PUBLICATIONS

"Materials & Processes: Fiber formats for composites," Publicly available Mar. 17, 2016. <https://www.compositesworld.com/articles/fiber-reinforcement-forms> (Year: 2016).*

* cited by examiner

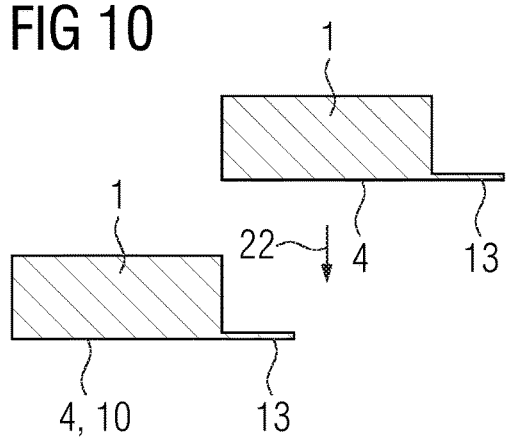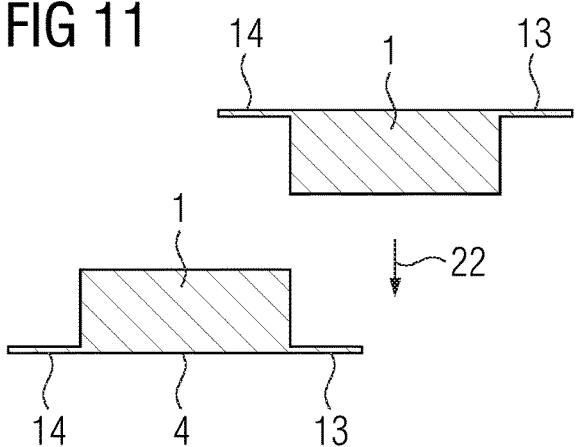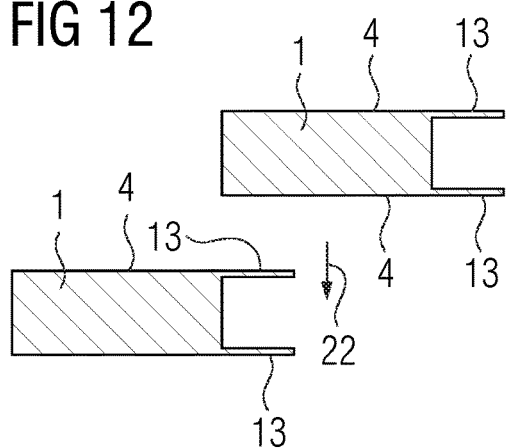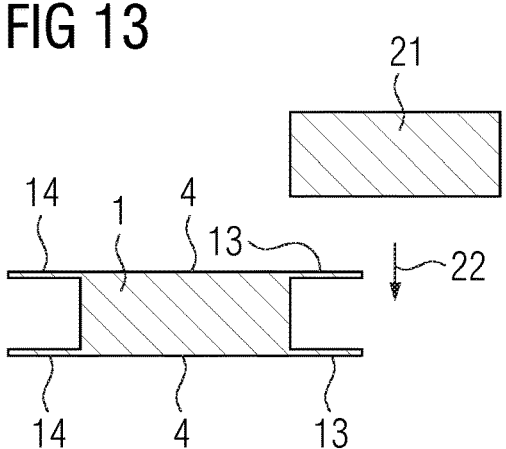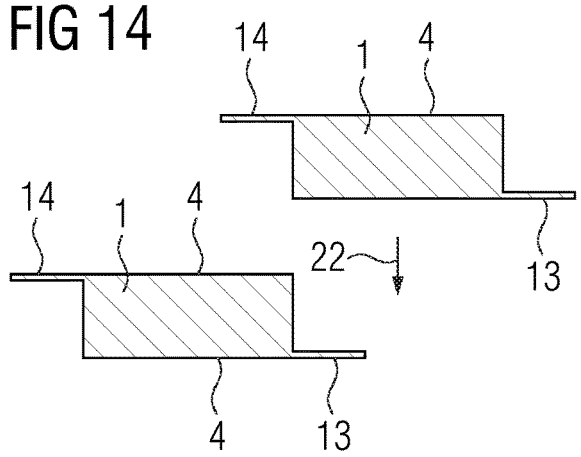

METHOD FOR MANUFACTURING OF A PRE-FORM PART FOR A WIND TURBINE BLADE AND MOLD FOR THE MANUFACTURING OF A PRE-FORM PART

CROSS-REFERENCE TO RELATED APPLICATIONS

This application claims priority to EP Application No. 21166625.0, having a filing date of Apr. 1, 2021, the entire contents of which are hereby incorporated by reference.

FIELD OF TECHNOLOGY

The following relates to a method for manufacturing of a pre-form part for a wind turbine blade comprising at least one component and an adhesive, wherein the component or at least one of the components is a mat-like component comprising fibres. Furthermore, the following relates to a mold arrangement for manufacturing of a pre-form part.

BACKGROUND

The amount of energy that can be generated by a wind turbine depends besides other factors on the length of the wind turbine blades. Longer blades increase the amount of energy that may be generated by the wind turbine for instance within one year. This leads to a demand for wind turbines comprising longer blades.

However, the need for longer blades also comes with challenges in the fabrication of the wind turbine blades, for instance with regard to the choice of materials and the manageability of the wind turbine blades during the manufacturing process. Regarding the challenges in the materials, the usage of carbon-based materials in the fabrication of the wind turbine blades may be advantageous. On the other hand, the manufacturing of larger wind turbine blades may require a more expensive manufacturing infrastructure and cause longer production times of a blade. These factors increase the production costs of the wind turbine blade and therefore translate into a longer wait for a return on investment. Furthermore, with rising complexity of the manufacturing process, the number of process steps and/or the time required for quality checks is increased. It is therefore desirable to facilitate the manufacturing of wind turbine blades.

One way of facilitating the manufacturing of the wind turbine blades is the use of pre-form parts which are pre-fabricated prior to the manufacturing of the wind turbine blade. This allows for manufacturing the wind turbine blade from a plurality of smaller pre-fabricated parts that are easier to handle during the blade manufacturing process. In addition, the pre-fabricated parts may be fabricated in parallel in advance to the wind turbine blade manufacturing reducing the total time for the wind turbine blade fabrication. As pre-form parts, for instance root segments, pre-packed spar caps, pre-assembled lightning protection means or pre-form parts of shell elements may be used.

The pre-form parts comprise a plurality of components, which are later integrated into the wind turbine blade during the manufacturing of the blade. These pre-forms parts may be used in addition to further pre-fabricated components. In order to make full use of the potential of the pre-form parts for the manufacturing of wind turbine blades, it is desired that also the manufacturing method for the pre-form parts is facilitated.

From the conventional art, different fabrication methods for wind turbine blades and/or members comprising fibre-based materials are known.

In U.S. Pat. No. 4,385,957 A, a webbing reinforced by carbon fibres is heated during its resin impregnation by passing an electric current through the carbon fibres whereby the carbon fibres act directly as heating mats in a system of layers of fibre reinforced material.

US 2013/0098527 A1 describes a rotor blade mold for producing a rotor blade of a wind power installation or a part thereof comprising a heatable mold portion having a shaping surface for shaping the rotor blade surface. The heatable mold portion has at least two heating portions each comprising at least one electrical resisting heating elements arranged at or beneath the shaping surface and a supply unit for supplying the at least one resistance heating element with electrical heating current.

SUMMARY

An aspect relates to an improved method for manufacturing of a pre-form part of a wind turbine blade.

According to embodiments of the invention, this problem is solved in a method as initially described comprising the steps:

Arranging the adhesive at one or more positions on the component, or arranging the components in a stack and arranging the adhesive at one or more positions between the components, and Heating the adhesive by providing an electric current to at least one actively heated layer, wherein the mat-like component is used as actively heated layer and/or wherein at least one additional mat-like heating means provided and arranged on top of or below the component or the stack of components is used as actively heated layer.

The pre-form part, which is manufactured in this method, comprises at least one component and an adhesive. The adhesive may be used for local stiffening of a mat-like component by heating the adhesive using the mat-like component as an actively heated layer and/or by applying an additional mat-like heating member on top of or below the component to be stiffened. The heated adhesive locally infiltrates the mat-like component causing a local stiffening of the component after the adhesive has hardened.

The pre-form part manufactured may also comprise at least two components, which are locally attached to each other by the adhesive. In this case, the adhesive is arranged at the interface of the two components creating a point-wise fixation at the positions, in which the adhesive has been arranged.

The adhesive, or the binder, respectively, is in particular thermally activatable, so that its adhering function may be activated by using the actively heated layer. The heating of the adhesive may lead to softening and/or melting of the adhesive enabling the intrusion of the adhesive into one or more components. It is also possible that a chemical reaction in the adhesive and/or between the adhesive and at least one of the components is initiated by the heating.

As adhesive, a thermoplastic adhesive may be used. Also the usage of a thermoset and/or an elastomer material as adhesive is possible. At least one of the components is a mat-like component comprising fibres. The mat-like component may be a fibre mat comprising a plurality of fibres and/or a fibre-based fabric. The mat-like component may comprise for instance a plurality of fibres strands, or fibre rovings, respectively. In order to form a structural constituent of the pre-form part, the mat-like component is locally stiffened using the adhesive and/or locally attached to a further component, in particular at a plurality of discrete points at the surface of the component, or at the interface between the mat-like component and the further component, respectively.

By using the adhesive for local or pointwise stiffening of the component or for fixation of the mat-like component to at least one further component, the majority of the fibres of the mat-like component remains dry, or is not soaked by the adhesive during heating, respectively. This allows for using the pre-form part later in a resin infusion-based process for manufacturing of a wind turbine blade.

The pre-form part may be made from a stack of two or more components, which are attached to each other by heating of the adhesive. By using a mold for the manufacturing of the pre-form part, also a shape, for instance a curvature, of the stack, or the pre-form part, respectively, may be created. The pre-form part may or may not be freestanding and its mechanical properties may differ from pre-fabricated wind turbine components. The pre-form part may be used afterwards in a manufacturing process of a wind turbine blade, wherein in particular the mat-like component may be soaked with a resin for finally obtaining the required mechanical strength as a part of the manufactured wind turbine blade. It is possible that in particular the mat-like component and/or any further component of the pre-form part is still flexible to some extent, as the components of the pre-form are only locally attached to each other by the adhesive. This allows for adapting the pre-form part to a shape required for the manufacturing of the wind turbine blade afterwards.

The usage of the adhesive for attaching the at least two components of the pre-form part together allows for avoiding other attachment processes like stitching of the components. This has the advantage that the mat-like component may be attached to other components of the pre-form part that cannot be stitched to the mat-like component like solid or rigid components or components with a comparatively large thickness. Furthermore, an influence of the stitched connections on the pre-form part, or on the wind turbine blade manufactured thereof, respectively, may be avoided.

For fabricating the pre-form part, the components are arranged in a stack and the adhesive is arranged at one or more positions between the stacked components. For attaching the components to each other, the adhesive needs to be heated. Therefore, an electric current is applied to an actively heated layer of the stack. The actively heated layer, or actively heatable layer, respectively, is heated by the applied electric current. In particular, the actively heated layer is heated only by the electric current. The actively heated layer may also be denominated as actively heatable layer.

As actively heated layer, the mat-like component may be used. By using the mat-like component as an actively heated layer, it is possible to use a component of the pre-form part, which is integrated in the pre-form part during the manufacturing process, for melting the adhesive. In addition or alternatively, also an additional mat-like heating means may be used. The additional mat-like heating means may be arranged on the top of or below the stack. The actively heated layer formed by the additional mat-like heating means therefore forms the topmost or bottommost layer of the stack, but unlike the mat-like component, it is not integrated in the pre-form part and therefore does not form a constituent of the pre-form part after manufacturing.

It is possible that the actively heated layer formed by the additional mat-like heating means may also be used between two components and/or two stacks, thereby producing two preforms in a single step while saving heat energy otherwise lost to the environment and/or to the mold. Likewise, it is possible that underneath or on top of a mat-like component, which is used as actively heated layer and which is integrated in a pre-form part, one more further components and further adhesive is arranged for simultaneously forming a further pre-form part making use of the actively heated layer integrated in the other pre-form part.

By using the mat-like component and/or the additional mat-like heating means as actively heated layer, the usage of a heatable mold for manufacturing of the pre-form part may be avoided and the process flexibility may be enhanced. Also, other heating procedures, like blowing hot air on the components to be adhered, may be avoided facilitating the manufacturing of the pre-form part. In an embodiment, the actively heated layer acts as a conformal heating mat. The ability of directly heating the mat-like component and/or the additional mat-like heating means allows for using unheated molds for the manufacturing of the pre-form parts and/or for fabricating them on other surfaces facilitating the manufacturing of the pre-form parts. In an embodiment, this reduces the complexity and the costs of the equipment used for the pre-form part manufacturing and therefore also for the fabrication of a wind turbine blade comprising one or more of the pre-form parts. However, if additional heating is required, the pre-form part may also be fabricated using a heated mold.

In addition, the usage of the mat-like component and/or of the additional mat-like heating means facilitates the fabrication of the pre-form part comprising at least one component with a large thickness and/or with a reduced thermal conductivity, since the heat transfer from a molding surface of a mold into the adhesive and therefore through the stacked components forming the pre-form part may be avoided. This may facilitate in particular the heat transfer to an adhesive arranged adjacently to a top most layer of the stack and therefore to the layer furthest away from a molding surface of a mold.

When the actively heated layer is an integral component of the pre-form part to be manufactured, the number of process steps is reduced since no additional heating means have to be arranged. When the actively heated layer is not an integral component of the pre-form part, the additional mat-like heating means may be used again for manufacturing another pre-form part leading to an increased process economy of the pre-form parts. In addition, also a large number of molds does not negatively influence the control on the manufacturing process, since the individual process steps of the pre-form part fabrication are simplified facilitating the control of the manufacturing process also in the case that a plurality of different pre-form parts are fabricated and/or a plurality of different molds or the like are used.

A mat-like component used as actively heating layer may be arranged on the topmost position of the stack, in the bottommost position of the stack or at any position in between. In particular, a usage of a mat-like component in or around the middle of the stack facilitates the heat transfer to the other components forming the pre-form part and/or to the adhesive arranged between the components. The additional mat-like heating means is arranged on top of the stack or below the stack, since it is not integrated in the pre-form part during the manufacturing process.

The mat-like component and/or the additional mat-like heating means used as actively heated layer are heated by an electrical current. The electrical current may be supplied to the actively heated layer by a power source which is connected to the actively heated layer for instance by using two or more electrodes. The electrodes may be arranged for instance on two opposing sides of the actively heated layer, so that a current flow through the actively heated layer may be established. For example, an actively heated layer that is arranged on top of the stack may be pressed onto the stack by using the electrodes.

Due to the electrical resistance of the mat-like component, or the mat-like heating means, respectively, the provided current causes Joule or resistive heating. The heat melts the adhesive and consolidation of the constituent layers, or the components, respectively, of the pre-form part ensues. Depending on the type of adhesive used, the actively heated layer may be heated for instance to a temperature between 55° C. and 175° C.

The at least one mat-like component forming the pre-form part may be provided on a spool, or on a reel, respectively. Also, an additional mat-like heating means may be provided on a spool so that a new section of the mat-like heating means may be unspooled when the section in contact with the components forming the pre-form part are degraded from use over time. The degraded section may be rolled on a further spool, so that the replacement of a degraded section of the mat-like heating means is facilitated. Multiple spools arranged on the same side and/or on opposing sides of the mold may be connected by a gear, a belt or a chain mechanism or the like, so that only one arresting means or motor may be used to arrest the spools or to apply a torque to all spools, respectively.

In an embodiment of the invention, a mat-like component and/or an additional mat-like heating means comprising electrically conductive fibres and/or an electrically conductive fabric, in particular carbon fibres and/or a carbon fibre-based layer, is used as actively heated layer. A mat-like means comprising electrically conductive fibres can easily be heated by providing the electric current to the mat-like component, or the additional mat-like heating means, respectively. In particular, the usage of carbon fibres is advantageous for a mat-like component forming an integral component of the pre-form part, since the carbon fibres exhibit both a suitable resistivity for electric heating and a suitable mechanical behaviour for fabrication of wind turbine blades. Besides carbon fibres, also other types of fibres with a comparable resistivity or their combinations or hybrids with carbon fibres may be used.

In an embodiment of the invention, at least one mat-like electrically insulating component and/or at least one core component is used as at least one further component of the pre-form part. The at least one further component of the pre-form part is attached to the at least one mat-like component using the adhesive. The at least one further component of the pre-form part may comprise electrically insulating fibres and/or an electrically insulating core since is not actively heated and hence not used as an actively heated layer.

In an embodiment, a glass fibre mat comprising glass fibres and/or glass fibre-based fabric is used as a mat-like electrically insulating component, and/or a foam core comprising a polymeric foam and/or a rigid core comprising a rigid material, in particular wood, plastic, ceramic and/or metal, is used as a core component. The usage of the mat-like component and/or the additional mat-like heating means as actively heated layer of the stack facilitates the usage of further components of the pre-form part, which are electrically insulating and/or which exhibit a poor thermal conductivity. Also, the usage of core components comprising a foam or a rigid material with a comparatively large thickness is possible. The core component may comprise for instance metal wires and/or metal blocks, a ceramic material as filler and/or as fibres and/or pre-cast polymer parts.

The shape of the foam core or rigid core component is not limited since the flexible mat-like component and/or the additional mat-like heating means may be adapted to the shape of the core component and hence lead to the manufacturing of a pre-form part in the desired shape defined by the core component. The ability to use different core materials enables a fabrication of different types of pre-form parts, which may form different portion of a wind turbine blade and/or which may form different functional parts of the wind turbine blade, respectively. The pre-form part may be for instance a shell of a wind turbine blade shell, a web structure, a leading edge, a trailing edge, a lightning conductor arrangement or each a segment thereof, respectively.

In an embodiment of the invention, a liquid or solid adhesive, in particular a particle-based adhesive, is used, which is arranged in between the components at a plurality of positions in form of drops or pellets. The adhesive may be provided for instance in a semi-liquid, semi-solid and/or dual-phase form. The adhesive may be dripped on the components during the formation of the stack, wherein two components arranged adjacently on the stack are locally attached to each other at the positions of the drops. In addition, or alternatively, the adhesive may be provided in form of pellets, which are distributed on or between the components during the formation of the stack. This leads to a pointwise attachment of two adjacently arranged components. Two components arranged adjacently in the stack are attached to each other at discrete interfacial positions. It is possible that the adhesive comprises an additive, for instance a particle-based additive comprising metal and/or ceramic particles or the like, enhancing the electrical and/or thermal conductivity of the adhesive.

In an embodiment, at least one actively heated layer, which is larger than the remainder of the stack in at least one dimension, is used, wherein the actively heated layer is arranged in such manner in or on the stack that it protrudes the remainder of the stack on at least two opposing sides of the stack after arrangement in or on the stack, wherein each of the protruding sections of the actively heated layer is connected to an electrode and/or to a fixation means.

The actively heated layer is in particular longer or wider than the remainder of the stack so that it exhibits at least two protruding sections that protrude from the other components, or the other layers of the stack, respectively. These protruding sections are connected to an electrode in order to provide the electric current used for heating the actively heated layer. In addition, the protruding sections may be attached to a fixation means so that the position of the actively heated layer and/or of the further layers of the stack remains stationary during the heating of the adhesive. The electrodes connected to the protruding sections may be connected to a power source that provides the current for the actively heated layer. The fixation means is in particular releasable so that the pre-form part may be removed from the fixation means after heating the adhesive and attaching the components of the pre-form part together.

In an embodiment of the invention, the actively heated layer is tensioned prior to the connection to the fixation means and/or the actively heated layer connected to the fixation means is tensioned by the fixation means. The tensioning of the actively heated layer reduces the presence of wrinkles in the mat-like component and/or the additional mat-like heating means used as actively heated layer. In particular, when using an additional mat-like means arranged on the top of the stack, the tensioning of the actively heated layer results in a good conformity of the components prior to their attachment and therefore facilitates the fabrication of a pre-form part meeting the desired shape.

In addition, by tensioning a mat-like component and/or an additional mat-like heating means arranged as topmost layer on the top of the stack, the components forming the pre-form part may be pressed together. This results in an efficient heat transfer between the actively heated layer and the components without the need for a closing lid, or a closed mold, respectively, so that for instance the usage of simple one-side molds or the like is possible.

In an embodiment, a mat-like component, which is arranged at the bottom and/or at the top of the stack, is used as an actively heated layer exhibiting the protruding sections. This has the advantage that the protruding sections are integrated into the pre-form part and that they protrude from the top or bottom layer of the pre-form part. The protruding sections may then also be used in a manufacturing process making use of the pre-form part. The protruding sections may be in particular used for connecting the pre-form part to an adjacently arranged further part, in particular by at least partly overlapping the further part. The protruding sections, or flaps, respectively, may therefore also be used as a section of the manufactured pre-form part used for attaching the pre-form parts to further parts and/or elements.

In an embodiment, after attaching the components of the pre-form part, the pre-form part is lifted using a lifting means attached to the protruding sections. The protruding sections of a mat-like component integrated in the pre-form part may be used for lifting the pre-form part, in particular from the position of its manufacture to a position of further processing of the pre-form part. It is possible that the protruding sections may be kept as a part of the pre-form part as previously explained. It is also possible that after manufacturing of the pre-form part and/or after the lifting of the pre-form part, one or more of the protruding sections are cut or truncated, respectively. When the protruding sections are cut prior to the lifting, the lifting may occur for instance using a lifting yoke with a mechanical, magnetic or vacuum means.

In an embodiment of the invention, the actively heated layer is arranged at least partly on an electrically conductive spool, wherein the spool is used as an electrode for providing the electric current to the actively heated layer. By using the electrically conductive spool, the electric current may be provided into a protruding section of the actively heated layer, wherein the protruding section is at least partly spooled on the spool. The electrically conductive spool may consist for instance of electrically conductive carbon and/or metal. As a second electrode for providing the current, an electrode pressing the actively heated layer on the stack and/or an electrode arranged on a protruding section of the actively heated layer on the opposing side of the spool may be used.

By using an actively heated layer arranged on the spool, it is possible to unspool the mat-like component used as actively heated layer and to cut it off from the spool after casting of the pre-form part. It is also possible to unspool an additional mat-like heating means used as actively heated layer in one or more manufacturing processes facilitating the replacement of a degraded mat-like heating means. Thereby, the degraded section of the mat-like heating means may be spooled on an additional spool on an opposing side of the mold. This allows for using also the additional spool as second electrode.

Also, one or more of components forming the pre-form part to be manufactured may be arranged on spools to facilitate providing these components. It is possible that multiple components and/or the mat-like heating means are arranged on top of each other are spooled on a mutual spool and/or that multiple components and/or the mat-like heating means are arranged on separate spools, respectively.

In an embodiment, the components are stacked on a molding surface of a mold. This allows for fabricating a pre-form part which comprises a shape corresponding to the molding surface. Although the local, pointwise attachment between the components of the pre-form part may not lead to a stable form of the pre-form part, the fabrication of the pre-form part in the molding surface enables a fixation of the components in accordance to a desired shape of the pre-form part. This facilitates the usage of the pre-form part of the manufacturing of a wind turbine blade, since the shape, in which the pre-form part is used in the wind turbine blade, may be provided to the pre-form part already by the molding surface during the manufacture of the pre-form part.

In an embodiment, a mold with a flat, a convex and/or a concave molding surface is used and/or a mold comprising a heat-reflective coating, a thermal barrier coating and/or a non-adherence coating on its molding surface is used. In particular, the usage of an at least partly convex molding surface in combination with a mat-like component and/or an additional mat-like heating means arranged as topmost layer on the top of the stack has the advantage that by tensioning the mat-like component, or the additional mat-like heating means, respectively, the components during the manufacturing of the pre-form part may be easily fixated by tensioning the actively heated layer. This allows fabricating the pre-form part in a mold without the need for a closed mold. Furthermore, the thickness of the pre-form part may be controlled and an efficient heat transfer between the components, or the layer of the stack, respectively, is obtained. As previously described, also the occurrence of wrinkles in particular in the mat-like components and/or in an additional mat-like heating means can be avoided so that the pre-form part may be manufactured in accordance to the shape of the molding surface. It is possible that a release agent is applied to the molding surface as non-adherence coating for preventing that the components and/or the actively heated layer and/or the adhesive adhere or stick on the molding surface. The non-adherence coating may be applied directly to the molding surface or onto a thermal barrier coating and/or a heat reflective coating of the molding surface or it may be a part of them. Alternatively, the thermal barrier coating and/or the heat reflective coating of the mold may be designed to also perform the role of a release agent.

The usage of a heat reflective coating and/or thermal barrier coating on the molding surface of the mold has the advantage that the heat induced by the actively heated layer is reflected towards the stack arranged on the molding surface and/or that a heat transfer through the molding surface into the body of the mold and therefore out of the stack may be prevented at least partly. This increases the efficiency of the manufacturing method and reduces the amount of energy required for heating the actively heated layer.

A molding arrangement according to an embodiment of the invention for the manufacturing of a pre-form part according to an embodiment of the invention comprises a mold with a molding surface, on which the components are arrangeable, at least two fixation means and at least two electrodes connectable to the actively heated layer and to a power source, wherein at least one electrode and at least one of the fixation means are arranged on each of two opposing sides of the molding surface.

In an embodiment of the invention, the fixation means is adapted to press the electrode and an actively heated layer arranged on the molding surface against each other. The molding surface of the mold may comprise for instance a convex or concave shape. It is also possible that the molding surface comprises a more complex shape with one or more convex or concave portions, enabling the manufacturing of complexly shaped pre-form parts. On each of two opposing sides of the molding surface, at least one fixation means and at least one electrode are arranged, wherein the fixation means may press the electrode against the actively heated layer. The fixation means may press the electrode for instance against an actively heated layer arranged as topmost layer of a stack arranged on the molding surface. It is also possible that the fixation means presses the electrode against a protruding section of an actively heated layer arranged at any position in the stack or that the protruding section is pressed against an electrode fixated for instance by screws on the mold adjacently to the molding surface.

A fixation means may press one or more electrodes against the actively heater layer, or the actively heated layer against one or more electrodes, respectively. The electrodes are connected or connectable to a power supply of the molding arrangement and/or to an external power source for supplying the current to the actively heated layer. The ability to use an external power source may reduce the amount of power sources needed, since a power source can be connected to the electrodes of the molding arrangement corresponding to the current process step.

In an embodiment, at least one of the fixation means is a weight means, a clamp, a press and/or an arresting means coupled to a spool. This enables to fixate the electrode on each of the two opposing sides of the molding surface towards the actively heated layer. By a weight means or by a clamp, the electrode and the actively heated layer, in particular a protruding section of the actively heated layer, may be pressed against the body of the mold fixating their positions and enabling an electrical contact between the electrode an the actively heated layer. A press may comprise a moveable piston pressing the electrode and the actively heated layer, in particular a protruding section of the actively heated layer, against the mold, respectively.

In an embodiment of the invention, the mold comprises a shielding door, which is adapted to cover the electrode and/or the actively heated layer on one side of the molding surface at least partly. By the shielding door, an unintended contact between a worker and the actively heated layer and/or the electrode, in particular after the electrode has been connected to an external power source, may be avoided. In particular, the fixation means on both sides of the molding surface each comprise at least one shielding door.

In an embodiment, a shielding door may be moved between a shielding position and an open position, wherein in the open position, an electrical connection between the electrode and the power source is interrupted. This may be achieved for instance by two electrical contact members of the shielding door, which are connected in the shielding position. The electrode and the power source are each connected to one of the contact members of the shielding door. When opening the shielding door, the connection between the two contact members is interrupted, so that also the connection between the electrode and the power source is interrupted.

The shielding door may in particular cover the actively heatable layer in the regions, which may be reached by hand from the outside of the mold. In the shielding position, also an unintended contact between a worker and the actively heated layer connected to the power source may be interrupted. When opening the shielding door, a connection between the electrodes and the power source is interrupted, so that working on the molding arrangement, in particular releasing of the fixation means and/or removing of the electrodes from the actively heated layer, can be done safely.

In an embodiment, the fixation means is adapted for applying a tension to a connected actively heated layer, in particular the fixation means is spring-loaded. This is especially advantageous when using a mold with a convex molding surface as part of the molding arrangement, since by the tension created by the fixation means to the actively heated layer, a mat-like component and/or an additional mat-like heating means arranged on the top of the stack may be used to tension the entire stack against the molding surface fixating the components towards each other during the manufacturing of the pre-form part. The tension may be applied by a spring-loaded fixation means, wherein the springs of the fixation means apply a tension to the actively heated layer and/or to the electrodes fixated against the actively heated layer. The tension may also be applied by an electrical motor, which is coupled to an electrically conductive spool, wherein the electrical motor serves as an arresting means holding the spool by applying a torque to the spool. The electrical motor may also be used for applying a tension to the actively heated layer arranged on the spool.

It is also possible that the fixation means are spring loaded in such manner that a force or a pressure acting on the electrodes and therefore also on the actively heated layer may be controlled. This avoids the occurrence of damage in the actively heated layer, in further components and/or in the stack, respectively.

In an embodiment of the invention, the molding surface is coated with a heat reflective coating, a thermal barrier coating and/or a non-adherence coating. The heat reflective coating reflects the heat induced by the actively heated layer towards the components stacked on the molding surface. By a thermal barrier coating, an unwanted heat dissipation from the stack into the mold may be prevented at least partly. Hence, a heat reflective coating and/or a thermal barrier coating may increase the efficiency of the manufacturing process. The non-adherence coating prevents an undesired adherence of the at least one component and/or the adhesive to the molding surface and/or to a thermal barrier coating or a heat reflective coating, respectively, applied to the molding surface.

A method for manufacturing a wind turbine blade or a wind turbine blade part according to an embodiment of the invention comprises the steps:
  Providing at least one pre-form part manufactured according to one of the preceding claims,
  Arranging the component in a blade mold,
  Casting the wind turbine blade or the wind turbine blade part in a resin infusion-based process, wherein the resin is infused into the pre-form-part.

In an embodiment, at least one pre-form part comprising one or more protruding sections is used, wherein at least one further part is provided and arranged in the blade mold, wherein the at least one protruding section of the component overlaps the further part at least sectionally. Alternatively, the protruding sections may also be cut prior to the casting of the wind turbine blade or the wind turbine blade part, respectively. It is in particular possible that the protruding sections of the mat-like component of the pre-form part are used to lift the pre-form part from the place, where it has been fabricated, into the blade mold, in which the wind turbine blade or the wind turbine blade part, respectively, is fabricated.

All details and advantages described in relation to the method for manufacturing a pre-form part according to an embodiment of the invention apply correspondingly to the mold arrangement according to an embodiment of the invention and the method for manufacturing a wind turbine blade or a wind turbine blade part according to an embodiment of the invention and vice versa.

BRIEF DESCRIPTION

Some of the embodiments will be described in detail, with reference to the following figures, wherein like designations denote like members, wherein:

FIG. 10 shows an embodiment for using protruding sections of pre-form parts in an embodiment of a method for manufacturing of a wind turbine blade;

FIG. 11 shows an embodiment for using protruding sections of pre-form parts in an embodiment of a method for manufacturing of a wind turbine blade;

FIG. 12 shows an embodiment for using protruding sections of pre-form parts in an embodiment of a method for manufacturing of a wind turbine blade;

FIG. 13 shows an embodiment for using protruding sections of pre-form parts in an embodiment of a method for manufacturing of a wind turbine blade;

FIG. 14 shows an embodiment for using protruding sections of pre-form parts in an embodiment of a method for manufacturing of a wind turbine blade;

DETAILED DESCRIPTION

Figure 1:
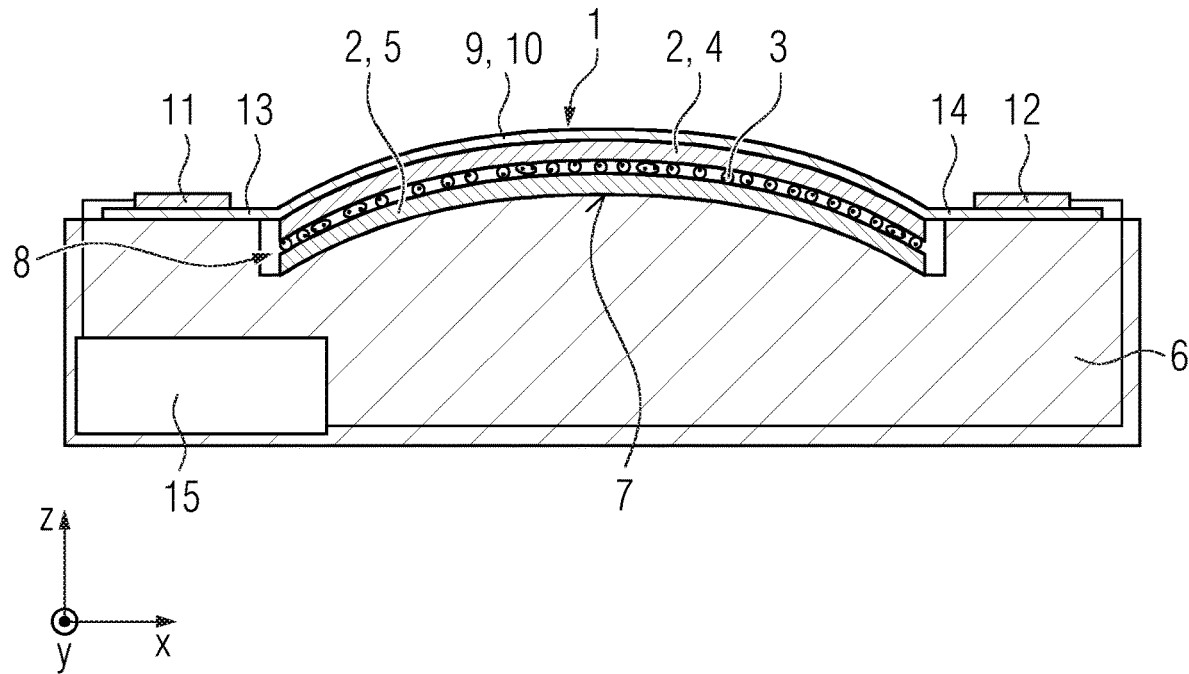
FIG. 1 shows a first embodiment of a method for manufacturing of a pre-form part.

In FIG. 1, a first embodiment of a method for manufacturing of a pre-form part 1 for a wind turbine blade is shown. The pre-form part 1 comprises at least two components 2, which are locally attached to each other by an adhesive 3. At least one of the components 2 is a mat-like component 4 comprising fibres. In this embodiment, also the further component 2 is a mat-like component 5, wherein both the mat-like component 4 and the mat-like component 5 comprise glass-fibres so that they are electrically insulating. The mat-like components 4, 5 are conformal layers and constituents of the pre-form part 1 to be manufactured. They may have for instance a rectangular shape, wherein their extension in length direction and width direction is larger than their thickness. In FIG. 1, the length direction is denoted as x-direction, the width direction is denoted as y-direction and the thickness is in z-direction. Compared to the length, the thickness of the depicted components 2 may in particular be smaller than depicted.

To define the shape of the pre-form part 1, a one-sided open mold 6 is used. The components 2, which form the pre-form part 1 to be manufactured, are arranged on the molding surface 7 of the mold 6 forming a stack 8. In this embodiment, the molding surface 7 is of convex shape leading also to a convexly shaped surface of the pre-form part 1 to be manufactured.

For forming the pre-form part 1 to be manufactured, the components 2 are glued to each other using a thermally activatable adhesive 3, which is distributed between the components 2 in form of droplets and/or pellets. The adhesive 3 may be provided in liquid and/or solid form. Also a semi-liquid, semi-solid and/or dual-phase form of the adhesive 3 is possible. The adhesive 3 may be distributed as drops or pellets in discrete positions between one or more pairs of adjacent layers of the stack 8. The heating of the adhesive 3 may lead to a softening and/or a melting of the adhesive 3. Also an initiation of a chemical reaction in the adhesive 3 and/or between the adhesive 3 and one or more adjacently arranged components is possible.

As adhesive 3, for instance a thermoplastic adhesive, a thermoset adhesive and/or an elastomeric adhesive may be used. The adhesive 3 may be a particle-based adhesive and/or it may comprise at least one component, for instance in form of particles, which increase the electrical and/or thermal conductivity of the adhesive. By melting for instance a thermoplastic adhesive 3, the components 2 are locally attached to each other. The attachment of the components 2 occurs at a plurality of spots, wherein the spots are created at the positions, on which the droplets and/or the pellets of the thermoplastic adhesive 3 are distributed between the components.

The pointwise fixation of the components 2 of the pre-form part 1 enables a further use of the pre-form part 1 in a method for fabricating a wind turbine blade component, in particular since the mat-like components 4, 5 are only locally adhered to each other and/or to further components, so that the majority of the fibre-based material forming the mat-like components 4, 5 may be soaked with a resin in a subsequent wind turbine blade fabrication process.

For attaching the components 2 to each other, the thermoplastic adhesive 3, which serves as a binder, is heated. A heating of the adhesive 3 occurs in this embodiment by using an additional mat-like heating means 9, which is arranged on top of the stack 8. The additional mat-like heating means 9 is used as an actively heated layer 10 of the stack 8 for heating the adhesive 3. The additional mat-like heating means 9 comprises electrically conductive fibres, in particular carbon fibres. It is also possible that the additional mat-like heating means 9 comprises an electrically conductive fabric comprising carbon fibres and/or a carbon fibre-based layer. Due to the electrically conductance of the carbon fibres, they are able to conduct an electrical current provided into the actively heated layer 10. However, because of the resistivity of the carbon fibres of the actively heated layer 10, a significant heating of the actively heated layer is obtained by resistive or Joule heating using an electrical current flowing through actively heated layer 10. Besides carbon fibres, also another conductive material, in particular with a comparable resistivity to carbon fibres, may be used in or as the additional mat-like heating means 9.

For providing the electrical current in the actively heated layer 10, the actively heated layer 10 is connected to two electrodes 11, 12, which are arranged on opposing sides of the molding surface 7. The electrodes 11, 12 are each connected to a protruding section 13, 14 of the additional mat-like heating means 9, which protrude the remainder of the stack 8 in the length direction of the components 2. It is alternatively possible that the protruding sections 13, 14 are protruding the remainder of the stack in width direction. In particular, the protruding sections 13, 14 may be smaller than depicted.

For providing an electric current to the electrodes 11, 12 and hence into the actively heated layer 10, the electrodes are connected to a power source 15. The power source 15 is adapted to provide an AC and/or DC current at a sufficient power for heating the actively heated layer 10 to a temperature in a range between 55° C. and 175° C. The temperature, to which the actively heated layer 10 is heated, may depend on the type of the adhesive 3, and/or the thermal characteristics of the component 2 of the preform part 1. The connection of the power source 15 to the actively heated layer 10 allows to use the actively heated layer 10 as a conformal heating mat for heating the stack 8, and/or the adhesive 3, respectively.

Figure 2:
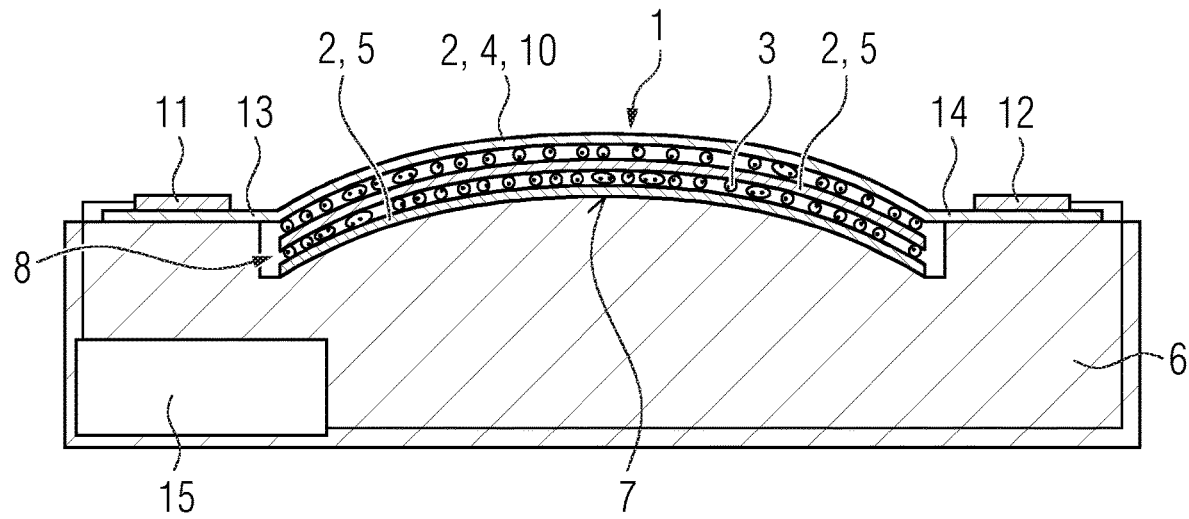
FIG. 2 shows a second embodiment of a method for manufacturing of a pre-form part.

In FIG. 2, a second embodiment of a method for manufacturing of a pre-form part 1 for a wind turbine blade is shown. In this embodiment, a mat-like component 4, which will form an integrated part of the pre-form part 1 to be manufactured, is used as actively heated layer 10. Hence, the actively heated layer 10 is a constituent of the pre-form part 1 to be manufactured. In this embodiment, the pre-form part 1 comprises three components 2, namely the mat-like component 4 used as actively heated layer 10 in the manufacturing process, as well as the two further components 2, which are each provided as mat-like electrically insulating components 5, which comprise for instance glass fibres. The adhesive 3 is arranged both between the bottommost electrically insulating mat-like component 5 and between the upper mat-like electrically insulating component 5 and the mat-like component 4 on top of the stack 8. Due to the arrangement of the adhesive 3 between the mat-like component 4 used as actively heated layer 10, the mat-like component 4 will form an integral part of the pre-form part 1 to be manufactured. The mat-like component 4 comprises electrically conductive fibres, in particular carbon fibres, which allow for heating the mat-like component 4 by an electric current as previously described. In addition, the usage of carbon fibres has the advantage that they are suitable for a usage in a wind turbine blade due to their mechanical properties.

Figure 3:
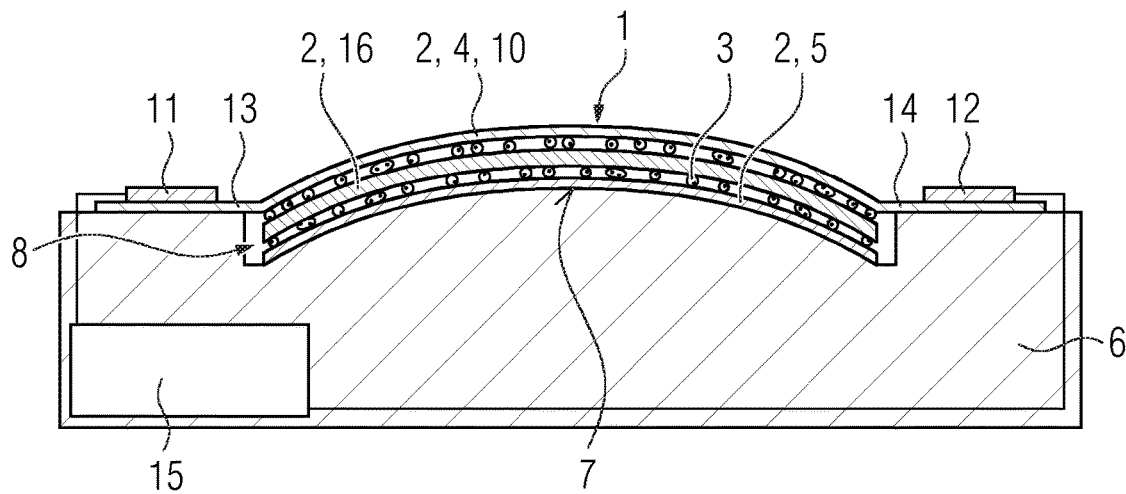
FIG. 3 shows a third embodiment of a method for manufacturing of a pre-form part.

In FIG. 3, a third embodiment of a method for manufacturing of a pre-form part 1 for wind turbine blade is depicted. In this embodiment, the pre-form 1 to be manufactured comprises a mat-like component 4 used as actively heated layer 10 as well as a mat-like electrically insulating component 5. In between the mat-like components 4, 5, a core component 16 of the pre-form part 1 is arranged. Between the core component 16 and each of the mat-like components 4, 5, the adhesive 3 is distributed.

The core component 16 may be for instance a foam core comprising a polymeric foam and/or a rigid core comprising a rigid material like wood, plastic, ceramics and/or a metal. The core component 16 may comprise for instance metal wires and/or metal blocks, ceramic as fillers and/or as fibres and/or pre-cast polymer parts. It is also possible that metal wires and/or metal blocks, ceramic as fillers and/or as fibres and/or pre-cast polymer parts are integrated in an electrically insulating mat-like component, in particular in such manner that there is no electrical contact between integrated metal parts to an adjacently arranged actively heated layer. For providing the electric current into the actively heated layer 10, the actively heated layer 10 is connected to the electrodes 11, 12.

Figure 4:
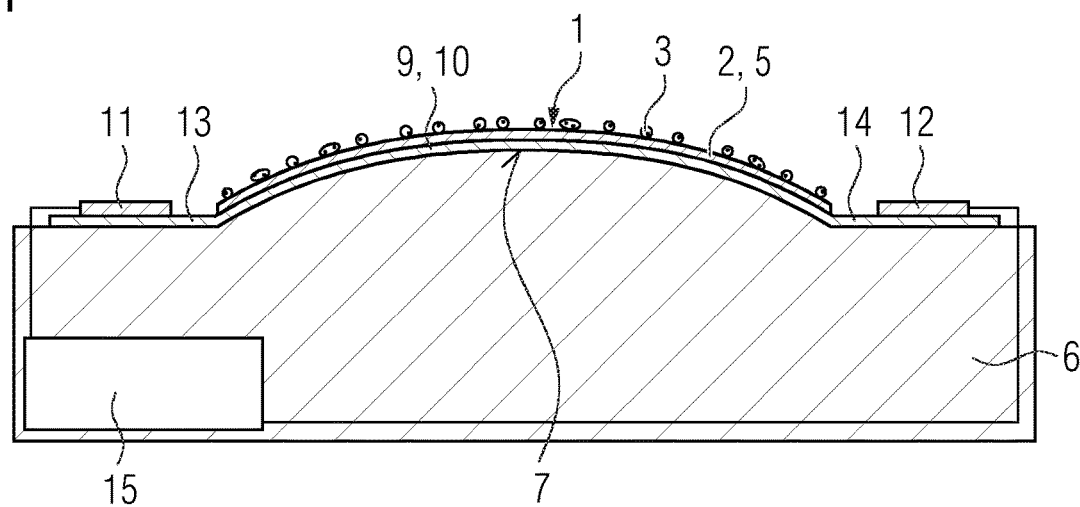
FIG. 4 shows a fourth embodiment of a method for manufacturing of a pre-form part.

In FIG. 4, a fourth embodiment of a method for manufacturing of a pre-form part 1 for wind turbine blade is depicted. In this embodiment, the pre-form 1 to be manufactured comprises a mat-like component 4 which is locally stiffened by arranging the adhesive 3 locally on the surface of the mat-like component 4. The mat-like component 4 is arranged on top of a mat-like heating member 9 used as actively heated layer 10. If the mat-like component 4 is electrically conductive, also the mat-like component 4, which is locally stiffened, may be used as actively heated layer 10. In this case, the mat-like component 4 may be connected directly to the electrodes 11, 12, so that a current may be induced using the electrical power source 15. By heating the actively heated layer 10, the adhesive may soften or melt to locally intrude into the mat-like component 4. After hardening of the adhesive, which may occur for instance after the heating by switching off the electrical current in the actively heated layer 10, the mat-like component 4 is locally stiffened at the positions of the infiltrated adhesive 3.

Figure 5:
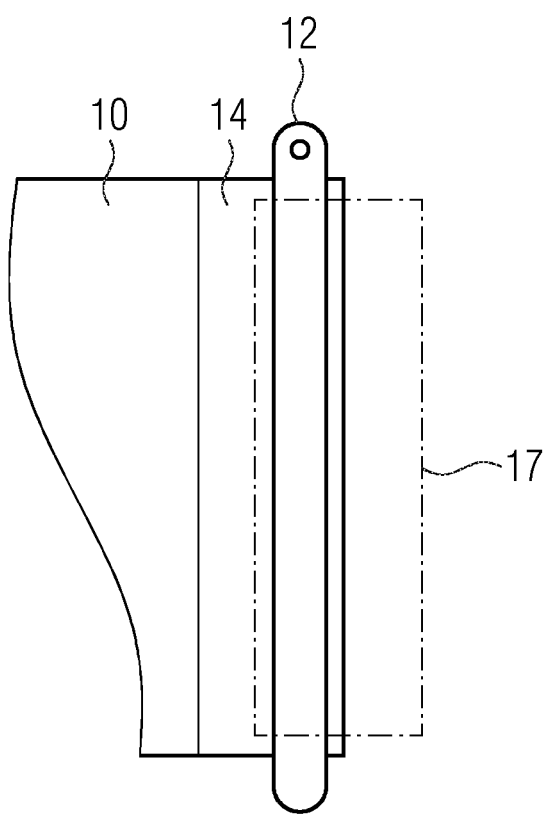
FIG. 5 shows a detailed view on an electrode connected to an actively heated layer.

In FIG. 5, a top view on the electrode 12 is shown. The electrode 12 is arranged on top of the protruding section 14 of the actively heated layer 10. The electrode 12 may be provided as a metal or carbon electrode or their composite comprising at least one conductive surface, which is brought into contact with the actively heated layer 10, in particular with the carbon fibres of the actively heated layer 10. The actively heated layer 10 may either be a mat-like component 4 and/or an additional mat-like heating means 9 as previously described. To improve the contact between the electrode 12 and the actively heated layer 10, a fixation means 17 may be used for pressing the electrode 12 against the actively heated layer 10. The fixation means 17 may for instance press the electrode 12 onto the actively heated layer 10 or vice versa. A fixation means 17 may be for instance a weight means, a press and/or a clamp. Also an arresting means coupled to a spool may be used as fixation means, in particular when a torque is applied to the spool, as will be described later.

Figure 6:
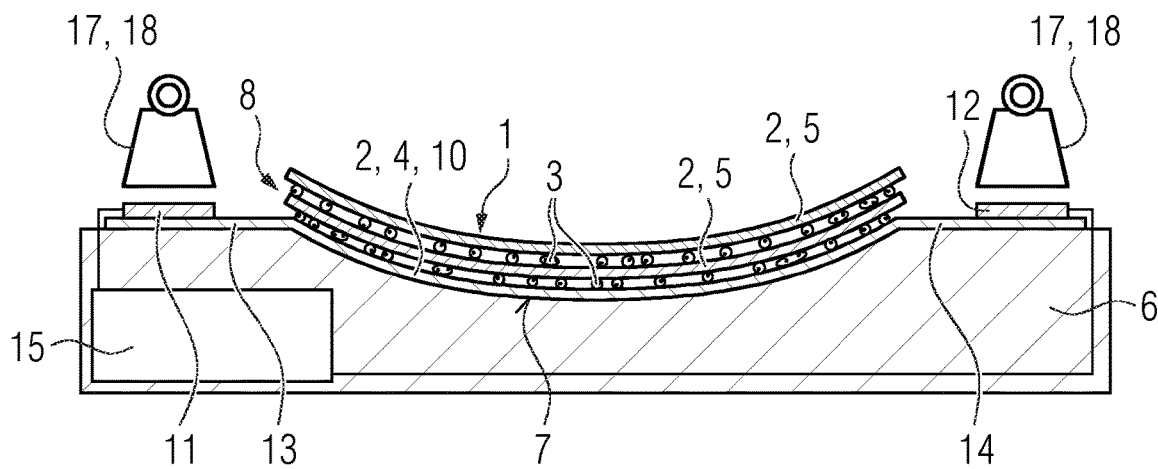
FIG. 6 shows a fifth embodiment of a method for manufacturing of a pre-form part.

In FIG. 6, a fourth embodiment of a method of manufacturing a pre-form part 1 for a wind turbine blade is shown. In this embodiment, a mold 6 with a concave molding surface 7 is used and a mat-like component 4 serves as actively heated layer 10. The mat-like component 4 is arranged on the bottom of the stack 8. In this embodiment, two weight means 18 are used as fixation means 17 for fixating the actively heated layer 10. In particular when using a mold 6 with a convex molding surface 7 as previously described, the weight means 18 may also be used for holding a tension of the mat-like component 4, or the actively heated layer 10, respectively. Applying a tension to the actively heated layer 10 prevents the formation of wrinkles in the mat-like component 4 and therefore enables a smooth surface of the pre-form part 1 to be manufactured.

In the aforementioned embodiments, the heating of the adhesive 3 occurs via the actively heated layer 10 so that the molds 6 may be advantageously unheated reducing the equipment cost for the pre-form part 1 manufacture. It is in particular possible that in the embodiments, another number of components 2 are used for fabricating the pre-form part 1 and/or that one or more mat-like components 4 and/or one or more additional mat-like heating means 9 are used as actively heated layers 10 in the manufacturing process. It is also possible that the pre-form part 1 comprises additional mat-like components 4 in the middle of the stack 8 used as actively heated layers 10, so that an even heat distribution in the stack 8 may be obtained.

Furthermore, it is possible that on top of the actively heated layer 10 in the embodiments described in relation to FIGS. 1 to 3, one or more additional components 2 are arranged, wherein an additional pre-form part is fabricated. Likewise, one or more components 2 may be arranged underneath the actively heated layer 10 in the embodiments described in relation to FIGS. 4 and 6. This allows for simultaneous manufacture of two pre-form parts 1. The actively heated layer 10 arranged between the components 2 forming each of the two pre-form parts 1 may be an integral part of one of the pre-form parts 1 or it may remain separate enabling to be reused.

In an embodiment the preform part manufacture may be conducted in a room or in a facility with an active or passive temperature control so that the heat from the actively heated layer 10, particularly from an actively heated layer 10 arranged on top of the stack 8, is not lost to the environment. This allows for reducing the energy consumption of the manufacturing process. In addition or alternatively, multiple molds 6 arranged in a vertical configuration may be used simultaneously for energy saving.

The mat-like components 4, 5 may have a thickness between 0.05 cm and 1 cm. A core component 16 used for fabricating the pre-form part 1 may have a larger thickness, for instance between 0.1 cm and 10 cm. The ability to heat directly one of the mat-like components 4 forming an integral part of the pre-form part 1 and/or to use an additional mat-like heating means 9 arranged on top or below of the stack 8 as an actively heated layer 10 provides an efficient way of heating the adhesive 3. In particular, the heat distribution in the stack may be more even than by using a heated mold, so that a good adherence between the mat-like components 4, 5 and a core component 16 may be obtained.

To further improve the heating of the adhesive 3, the molding surface 7 of the mold 6 may be coated with a thermally reflective coating and/or a with a thermal barrier coating. This enables the reflection of heat into the stack 8 and therefore also towards the adhesive 3 and reduces the amount of heat dissipated into a body of the mold 6. This reduces the power that has to be provided by the power source 15. It is possible that a release agent is applied to the molding surface 7 of the mold 6 as a non-adherence coating for enabling non-adherence of the components 2 and/or the actively heated layer 10 and/or the adhesive on the molding surface 7. The release agent may also be applied to a thermal barrier coating and/or to a heat reflective coating of the molding surface and/or it may be a part of them. Alternatively, the thermal barrier coating and/or the heat reflective coating of the mold may be designed to also perform the role of a release agent.

After fabrication of the pre-form part 1, the protruding sections 13, 14 of the actively heated layer 10 may be cut. It is also possible that one or more of the protruding sections 13, 14 remain as a part of the pre-form part 1 for further use.

Figure 7:
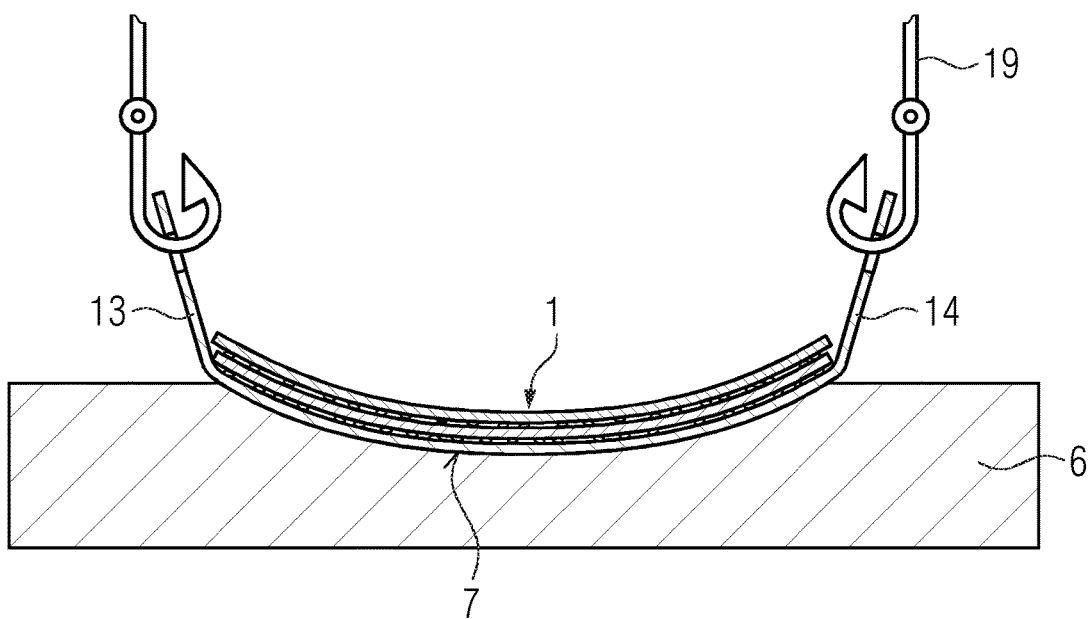
FIG. 7 shows an example for lifting a pre-form part manufactured in an embodiment of the method according to embodiments of the invention.

One possible use of the remaining protruding sections 13, 14 is depicted in FIG. 7. The protruding sections 13, 14 may be used for lifting the pre-form part 1 from the position of its manufacturing towards a position of further processing of the pre-form part 1. Therefore, the protruding sections 13, 14 of the actively layer 10 may be coupled to a lifting means 19, for instance to the hooks of a crane. This allows for lifting the pre-form part 1 out of the mold 6, in which the pre-form part 1 was manufactured, towards a position of further processing, for instance a blade mold used for manufacturing of a wind turbine blade, or a wind turbine blade part, respectively. Prior to the lifting of the pre-form part 1, the electrodes 11, 12 as well as the fixation means 17 are removed, or released, respectively, so that the pre-form part 1 can be lifted from the molding surface 7 of the mold 6.

Figure 8:
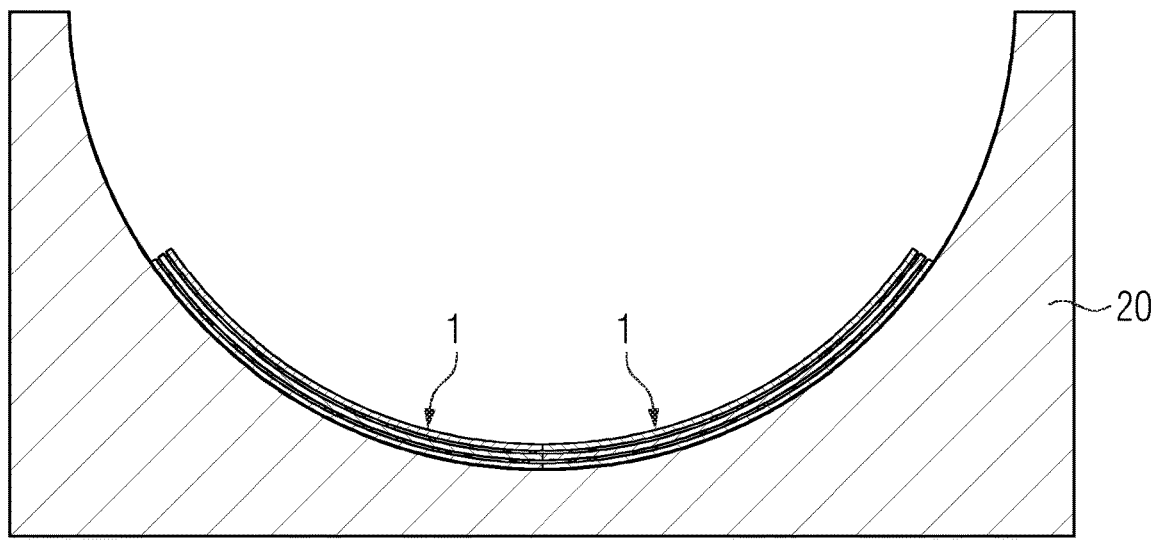
FIG. 8 shows a first embodiment of a method for manufacturing of a wind turbine blade using a pre-form part manufactured in a method according to embodiments of the invention.

In FIG. 8, a method for manufacturing of a wind turbine blade or a wind turbine blade part is illustrated. The method comprises the steps of providing at least one pre-form part 1 manufactured in a method for manufacturing of a pre-form part according to embodiments of the invention, for instance according to one of the aforementioned embodiments.

In the method for manufacturing of a wind turbine blade or a wind turbine blade part, two pre-form parts 1 are provided. The pre-form parts 1 are arranged in a blade mold 20. The wind turbine blade or the wind turbine blade part is casted in the blade mold 7 using a resin infusion-based process, in which the resin is infused into the pre-form parts 1, in particular into the mat-like components 4, 5 of the pre-form parts 1. As previously mentioned, the pre-form parts 1 may be lifted into the blade mold 7 by using the protruding sections 13, 14. After arranging one of the pre-form parts 1, the protruding sections 12, 13 may be cut. Alternatively, the protruding sections 12, 13 can be used for connecting the pre-form parts 1 to each other and/or to at least one further part 21 of the wind turbine blade to be manufactured.

Figure 9:
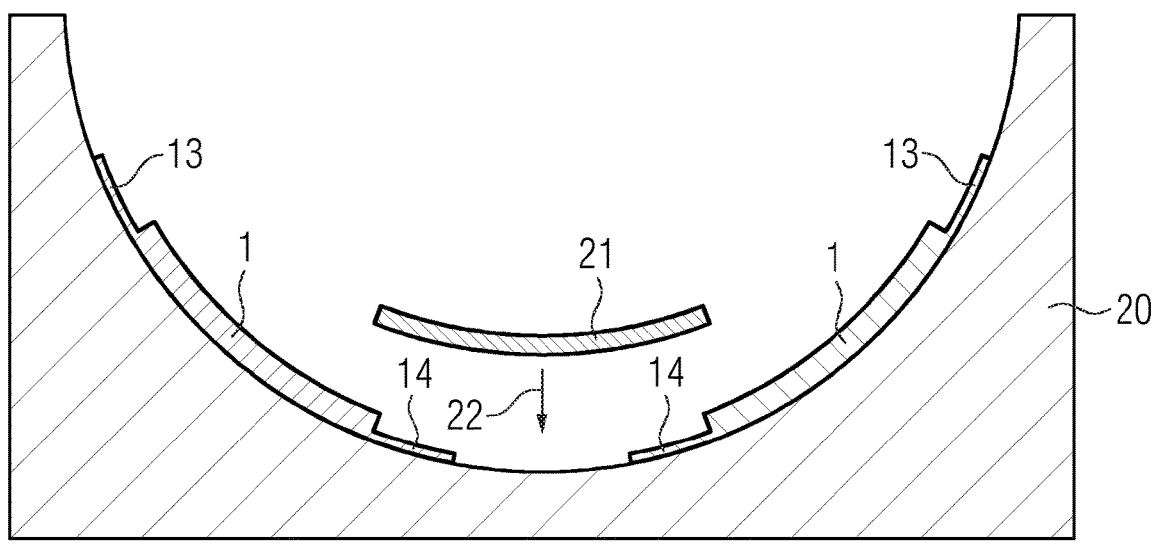
FIG. 9 shows a second embodiment of a method for manufacturing a wind turbine blade using a pre-form part manufactured in a method according to embodiments of the invention.

In FIG. 9, a second embodiment of a method for manufacturing of a wind turbine blade or a wind turbine blade part is shown. In this embodiment, two pre-form parts 1 each comprising two protruding sections 13, 14 are arranged in the blade mold 20. A further part 21 forming a component of the wind turbine blade, or the wind turbine blade part, respectively, to be manufactured is arranged in such manner that it is overlapped by a protruding section 14 of each of the pre-form parts 1.

As previously described, it is possible that more than one mat-like component 4 is used as an actively heated layer 10 in the manufacturing of the pre-form part 1. It is in particular possible that both a mat-like component 4 on the bottom of the stack as well as a mat-like component 4 placed on the top of the stack 8 are used and that they each comprise protruding sections 13, 14, so that different configurations of pre-form parts with protruding sections 13, 14 can be created. The number of protruding sections 13, 14 may be reduced after manufacturing of the pre-form part 1, by cutting one or more of the protruding sections 13, 14.

FIGS. 10 and 11 depict two possible configurations for attaching two pre-form parts 1 each comprising protruding sections 13, 14 of a mat-like component 4 used as actively heated layer 10 and placed on the top or the bottom of the stack 8, respectively. As indicated by the arrows 22, the different pre-form parts 1 may be moved towards each other, for instance by the aforementioned lifting of one of the pre-form parts 1, so that at least one of the protruding sections 13, 14 overlaps a further component, or the further pre-form part 1, respectively, at least partly.

In FIGS. 12 to 14, different embodiments of using pre-form parts 1 comprising protruding sections 13, 14 on both the top and the bottom side of the stack 8, and/or on two different sides of the pre-form part 1, respectively, are depicted. Since the overlapping protruding sections 13, 14 are formed by the mat-like components 4, they may be folded away in order to arrange a neighbouring component 1, or a neighbouring further element 21, respectively. It is possible that during the manufacturing of the pre-form parts 1, both mat-like components 4 were used as actively heated layers 10 and/or that only one of the mat-like components 4 was used as an actively heated layer 10.

Figure 15:
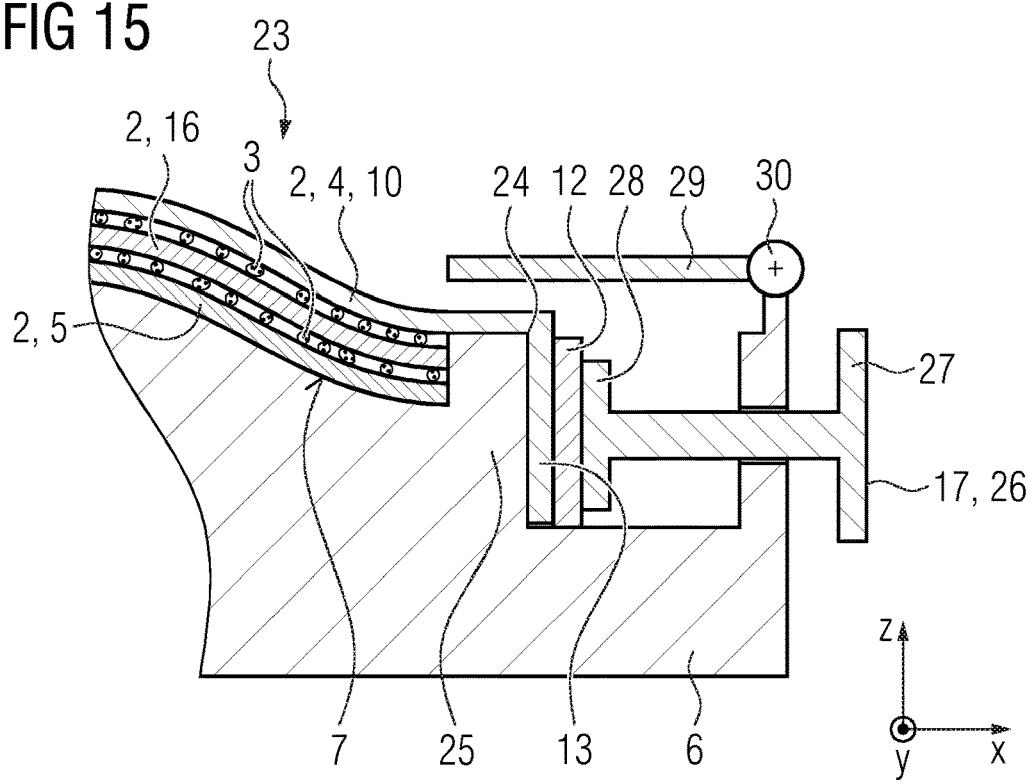
FIG. 15 shows a first embodiment of a molding arrangement for usage in an embodiment of a method for manufacturing of a pre-form part.

In FIG. 15, a first embodiment of a molding arrangement 23 for use in a method for manufacturing of a pre-form part 1 is shown. The molding arrangement 23 comprises a mold 6 with a molding surface 7, on which the components 2 for fabrication of the pre-form part 1 may be stacked. In addition, the molding arrangement 23 comprises at least two releasable fixation means 17 arranged on opposing sides of the molding surface 7. For the sake of simplicity, only the right portion of the mold 6 is shown. On the opposing side a comparable configuration of the fixation means 17 and the electrode 11 is used.

The electrodes 11, 12 are connectable to a power source 15. On each of the opposing sides of the mold surface 7, one of the electrodes 11, 12 and a fixation means 17 are arranged. The fixation means 17 is adapted to press the respective electrode 11, 12 and the actively heated layer 10 against each other. The electrode 12 may be pressed for instance against the protruding section 14, which is folded over an edge 24 of a surrounding 25 of the molding surface 7. The electrode 12 is pressed against the actively heated layer 10, or the protruding section 14, respectively, by the fixation means, wherein the fixation means 17 is provided as a press 26. The press 26 may comprise a moveable piston 27 with a pressing portion 28, wherein the piston 27 may be moved automatically or manually to press the electrode 12 against the actively heated layer 10, and the surrounding 25, respectively.

In addition, the mold 6 comprises a shielding door 29, which is adapted to cover the electrode 12 and/or the actively heating layer 10 at least partly. The shielding door 29 is shown in its closed position, where it covers at least partly the actively heated layer 10. In particular, the shielding door 29 covers the protruding section 13 of the actively heated layer 10. By the shielding door 29, an unintended physical contact between a worker and the electrode 12 and/or the actively heated layer 10 may be prevented.

The electrical connection between the electrodes 11, 12 and the power source 15 occurs in such manner that the electrical connection is interrupted when the shielding door 29 is moved to its open position, for instance, when the shielding door 29 is pivoted around a hinge 30, which couples the shielding door 29 to the mold 6. Therefore, it is possible that the electrode 12 is connected to a first contact member (not shown) of the shielding door 29 and the power source 15 is coupled to a second contacting member (not shown) of the shielding door 29, wherein an electrical contact between the first and second contacting member of the shielding door 29 is only established when the shielding door 29 is in its shielding or closed position, respectively.

Figure 16:
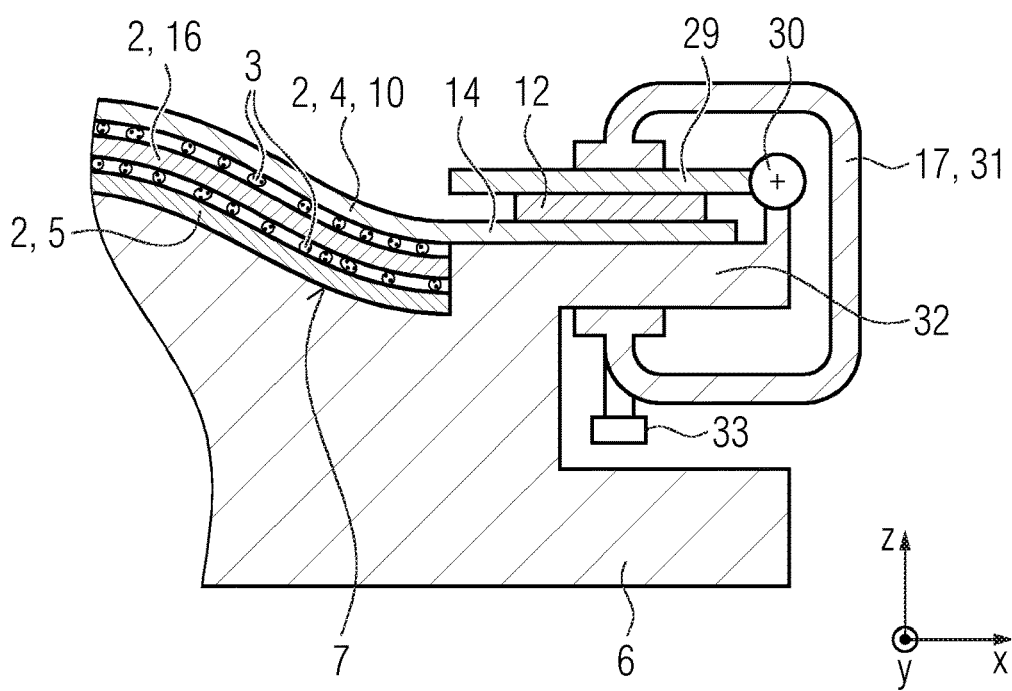
FIG. 16 shows a second embodiment of a molding arrangement for usage in a method for manufacturing of a pre-form part.

In FIG. 16, a second embodiment of a molding arrangement 23 for a method for manufacturing of a pre-form part 1 is shown. In this embodiment, the fixation means 17 is provided as a clamp 31. The clamp 31 comprises a C-shape encompassing an edge section 32 of the mold 6 as well as shielding door 29, the electrode 12 and the protruding section 13 of the actively heated layer 10. The clamp 31 may be fixated to the mold 6 and to the electrode as well as the actively heated layer 10 using a screw 33 pushing against the edge section 32 opposite to the protruding section 13 and the electrode 12.

In the aforementioned embodiments of the molding arrangements 23, the fixation means 17 are able to hold a tension provided to the actively heated layer 10 arranged at the top of the stack 8. It is in addition possible that the depicted fixation means 17 are spring-loaded, so that they may provide a tension to the actively heated layer 10, when the fixating mean fixates the actively heated layer 10.

Therefore, in the first embodiment depicted in FIG. 14, the spring-loaded fixation means 17 may provide a force acting in the downward (negative z-direction) so that the actively heated layer 10 is tensioned by pressing the depicted components towards the convex molding surface 7. The spring-loading has the further advantage that a force or a pressure acting on the electrodes 11, 12 and therefore also on the actively heated layer 10 may be controlled. This avoids the occurrence of damage in the actively heated layer 10, in further components 2 and/or in the stack 8, respectively.

In the second embodiment shown FIG. 15, this tension might be applied by spring-loading the fixation means 17 in such manner that a force in the x-direction is applied to the actively heated layer 12 likewise pressing the components 2 forming the pre-form part 1 on the convex molding surface 7.

In both embodiments, the molding surface 7 may be coated with a thermal reflective coating and over the thermal barrier coating, as previously described. The molding surface 7 may have a convex shape or any other shape as previously described.

In both embodiments, the electrodes 11, 12 arranged on both sides of the molding surface 7 may be provided as separate components. Alternatively, the electrodes 11, 12 may be integrated in the mold 6, for instance by screwing the electrode against the body of the mold 6, so that they remain stationary in the edge section adjacent to the molding surface 7. Alternatively, the electrodes 11, 12 may be integrated into the shielding door 27, whereby opening of the shielding door 27 disconnects the actively heated layer 10 or the stack 8 from the electrodes 11, 12. Besides the usage of the protruding sections 13, 14 for connecting the electrodes 11, 12, it is also possible that the electrodes 11, 12 are arranged on the top of the stack 8 in a section of the actively heated layer 10 that overlaps the remainder of the stack 8. It is possible that alternatively to the press 26 and the clamp 31, a weight means 18 is used as fixation means 17, as previously described.

Figure 17:
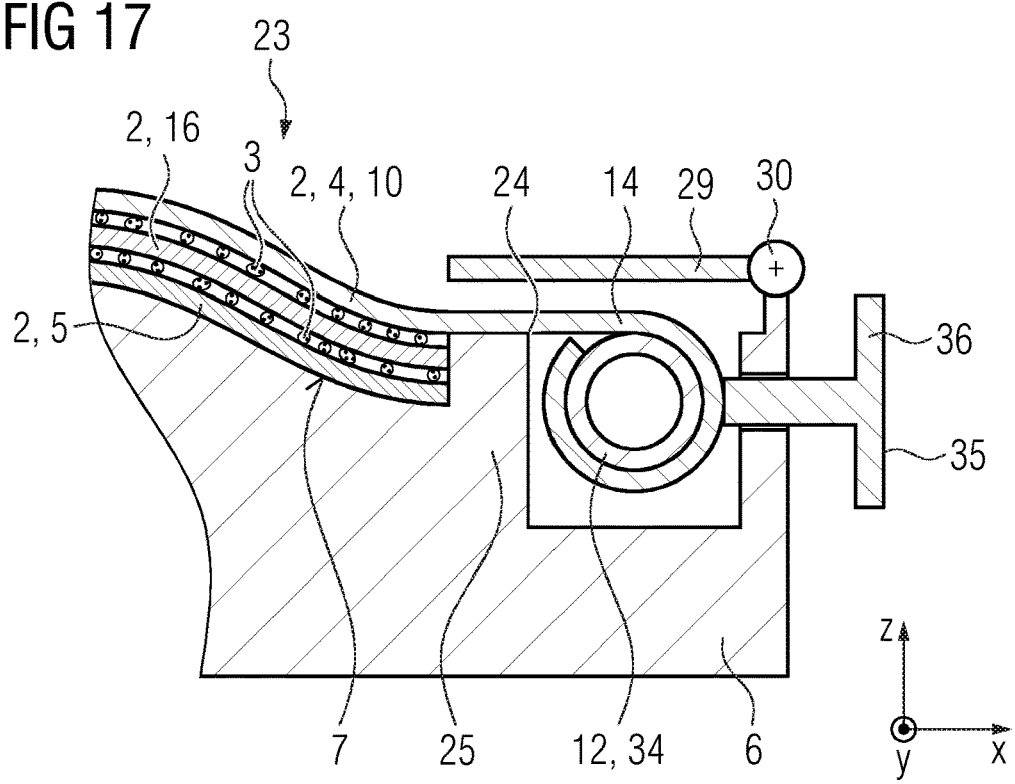
FIG. 17 shows a third embodiment of a molding arrangement for usage in a method for manufacturing of a pre-form part.

In FIG. 17, a third embodiment of a molding arrangement 23 for a method for manufacturing of a pre-form part 1 is shown. In this embodiment, the actively heated layer 10 is provided on a spool 34. The protruding section 14 is at least partly spooled on the spool 34. The spool 34 is electrically conductive so that it may be used as electrode 12 to supply the electrical current for heating the actively heated layer 10. The spool 34 may consist for instance of carbon and/or metal.

As fixation means 17, an arresting means 35 comprising a rotatable piston 36 is used. The piston 36 arrests the spool 34 to prevent it from turning, so that a tension of the actively heated layer 10 may be hold. As an alternative, also an electric motor (not shown) coupled to the spool 34 may be used as arresting means, for instance by applying a torque to the spool 34. The electrical motor may also be used for tensioning the actively heated layer 10 or any other component provided on a further spool, respectively.

Besides a mat-like component 4, which is integrated as a component 2 in the pre-form part 1 to be manufactured, also a mat-like heating means 9 may be arranged on the spool 34. This allows for unspooling a new section of the mat-like heating means 9 once the unspooled section used in one or more fabrication processes as actively heated layer 10 has degraded and needs to be replaced. It is possible that the mat-like component 4 is unspooled from the spool 34 and simultaneously spooled on a further spool arranged on the opposing side of the molding surface 7. This allows for using an electrically conductive further spool also as a further electrode.

As an alternative, the spool 34 with the arresting means 35 may be combined with a further fixation means 17 as described in conjunction with FIGS. 15 and 16, wherein the further fixation means 17 is arranged on the opposing side of the molding surface 7.

Figure 18:
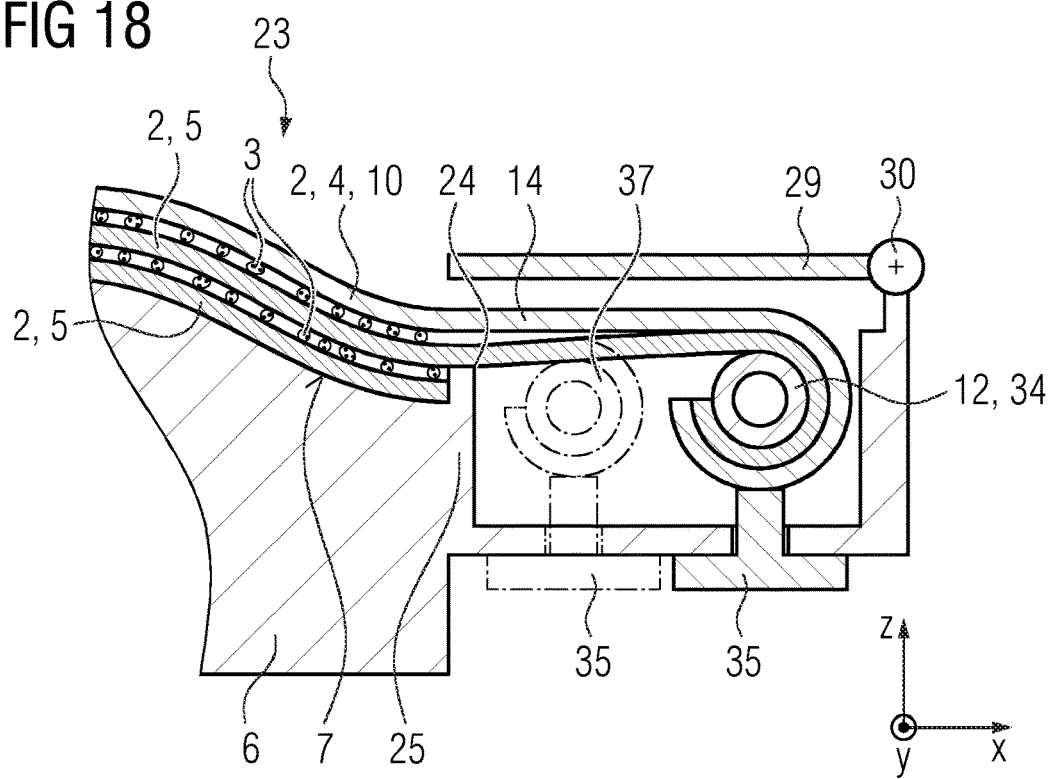
FIG. 18 shows a fourth embodiment of a molding arrangement for usage in a method for manufacturing of a pre-form part.

In FIG. 18, a fourth embodiment of a molding arrangement 23 for a method for manufacturing of a pre-form part 1 is shown. In this embodiment, both the actively heated layer 10 and a further mat-like component 5 of the pre-form part 1 to be fabricated are arranged on the spool 34. The mat-like component 4 used as actively heated layer 10 and the further mat-like component 5 are arranged in a sandwich structure, which is spooled on the spool 34. The actively heated layer 10 is connected to the electrically conductive spool 34, so that the spool 34 may be used as electrode 12 as previously described.

Alternatively, it is possible that the further mat-like component 5 is arranged on a further spool 37 as drawn in dashed lines. In this alternative, the actively heated layer 10 is spooled on the spool 34 like shown in FIG. 17. Also, for the further spool 37, an arresting means 35 may be provided as previously described. It is possible that multiple spools 34, 37 arranged on the same side and/or on opposing sides of the mold 6 may be connected by a gear, a belt or a chain mechanism or the like, so that only one arresting means 35 or motor may be used to arrest the spools 34, 37 or to apply a torque to all spools 34, 37, respectively.

In addition or alternatively to using an electrically conductive spool 34, the mat-like heating means 9 and/or the mat-like component 4 used as actively heated layer 10 may be provided on a non-conductive spool, wherein the electrodes 11, 12 are pressed onto the actively heated layer 10 as discussed in relation to FIGS. 15 and 16.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for manufacturing of a pre-form part for a wind turbine blade comprising at least one component and an adhesive, wherein the at least one component is a component comprising fibres, the method comprising:
   arranging the at least one component and at least one further component in a stack on a molding surface of a mold and arranging the adhesive at one or more discrete positions between the at least one component and the at least one further component; and
   heating the adhesive by providing an electric current to at least one actively heated layer, wherein the at least one component is used as actively heated layer and/or wherein at least one additional heating element provided and arranged on top of or below the at least one component or the stack is used as actively heated layer, wherein heating the adhesive results in the at least one component or the at least one component and the at least one further component being locally adhered at the one or more discrete positions;
   wherein a majority of the at least one component is not soaked with the adhesive during the arranging and/or is not locally adhered by the heating such that the majority of the at least one component may later be soaked with a resin;
   wherein the at least one actively heated layer is larger than the remainder of the stack in at least one dimension, wherein the at least one actively heated layer is arranged in such manner in or on the stack that it protrudes the remainder of the stack on at least two opposing sides of the stack after arrangement in or on the stack; and
   wherein the at least one actively heated layer and the at least one further component are arranged at least partly on an electrically conductive spool, or wherein the at least one actively heated layer is arranged at least partly on the electrically conductive spool and the at least one further component is arranged at least partly on a non-conductive spool, wherein the electrically conductive spool is used as an electrode for providing the electric current.

2. The method according to claim 1, wherein the component and/or an additional heating element comprising electrically conductive fibres and/or an electrically conductive fabric is used as actively heated layer.

3. The method according to claim 2, wherein at least one electrically insulating component and/or at least one core component is used as the at least one further component of the pre-form part.

4. The method according to claim 3, wherein a glass fibre mat comprising glass fibres and/or glass fibre-based fabric is used as the at least one electrically insulating component, and/or a foam core comprising a polymeric foam and/or a rigid core comprising a rigid material is used as the at least one core component.

5. The method according to claim 1, wherein a liquid and/or solid adhesive is used, which is arranged in between the components at a plurality of discrete positions in form of drops or pellets.

6. The method according to claim 1, wherein a fixation means is used to press the electrode to the at least one actively heated layer and/or the at least one further component.

7. The method according to claim 6, wherein the actively heated layer is tensioned prior to the connection to the fixation device and/or the actively heated layer connected to the fixation means is tensioned by the fixation means.

8. The method according to claim 6, wherein a respective component arranged at the bottom and/or at the top of the stack, is used as an actively heated layer exhibiting the protruding sections.

9. The method according to claim 6, wherein after heating the adhesive, the pre-form part is lifted using the protruding sections.

10. The method according to claim 6, wherein the fixation means comprises a piston or an electric motor.

11. The method according to claim 1, wherein the molding surface is a flat, a convex, and/or a concave molding surface and/or a heat-reflective coating, a thermal barrier coating, and/or a non-adherence coating is used on the molding surface.

12. The method according to claim 1, wherein carbon fibres and/or a carbon fibre-based layer are used as actively heated layer.

13. The method according to claim 1, wherein a particle-based adhesive is used.

14. The method according to claim 1, wherein the at least one component is not stitched.

15. The method according to claim 1, wherein an electrically conductive spool is used as the electrode for providing the electric current and the at least one actively heated layer is arranged at least partly on the electrically conductive spool, and wherein the fixation means is a piston configured to arrest the electrically conductive spool.

16. A method for manufacturing of a pre-form part for a wind turbine blade comprising at least one component and an adhesive, wherein the at least one component is a component comprising fibres, the method comprising:

arranging the at least one component and at least one further component in a stack on a molding surface of a mold and arranging the adhesive at one or more discrete positions between the at least one component and the at least one further component; and heating the adhesive by providing an electric current to at least one actively heated layer, wherein the at least one component is used as actively heated layer and/or wherein at least one additional heating element provided and arranged on top of or below the at least one component or the stack is used as actively heated layer, wherein heating the adhesive results in the at least one component or the at least one component and the at least one further component being locally adhered at the one or more discrete positions;

wherein a majority of the at least one component is not soaked with the adhesive during the arranging and/or is not locally adhered by the heating such that the majority of the at least one component may later be soaked with a resin;

wherein the at least one actively heated layer is larger than the remainder of the stack in at least one dimension, wherein the at least one actively heated layer is arranged in such manner in or on the stack that it protrudes the remainder of the stack on at least two opposing sides of the stack after arrangement in or on the stack; and wherein the at least one actively heated layer contacts an electrode for providing the electric current, wherein a fixation means presses the electrode to the at least one actively heated layer, wherein the fixation means is a clamp or a piston.

\* \* \* \* \*